United States Patent
Yamada et al.

(12)

(10) Patent No.: US 6,355,283 B1
(45) Date of Patent: Mar. 12, 2002

(54) PROCESS FOR MAKING SOYBEAN CURD BREAD

(76) Inventors: Toyofumi Yamada, Nishiiru Bishamon-cho 457, Imadegawa Agaru 4 Chome, Tounodandori, Kamigyo-ku, Kyoto-city, Kyoto; Isao Moriya, 25-1, 1 Chome, Sone, Midori-ku, Nagoya-city, Aichi, both of (JP)

( * ) Notice: Subject to any disclaimer, the term of this patent is extended or adjusted under 35 U.S.C. 154(b) by 0 days.

(21) Appl. No.: 09/655,864

(22) Filed: Sep. 6, 2000

(30) Foreign Application Priority Data

Nov. 26, 1999 (JP) .......................................... 11-336277

(51) Int. Cl.⁷ .............................. A21D 2/02; A21D 2/36
(52) U.S. Cl. ............................................. 426/21; 426/26
(58) Field of Search .............................. 426/18, 21, 26, 426/19, 46, 549, 552, 634, 622

(56) References Cited

U.S. PATENT DOCUMENTS 5,874,538 A * 2/1999 Kuwata et al. ............. 530/378

FOREIGN PATENT DOCUMENTS

| JP | 52234  | 3/1986  |
| JP | 316983 | 12/1993 |
| JP | 163954 | 6/1996  |

* cited by examiner

*Primary Examiner*—Keith Hendricks
(74) *Attorney, Agent, or Firm*—Armstrong, Westerman & Hattori, LLP

(57) ABSTRACT

A process for making a soybean curd bread which comprises adding magnesium chloride to a soybean milk having a predetermined solid content and at a temperature of about 60° C. to 90° C. to prepare homogeneously emulsified soybean curd, adding a bread dough composed of wheat flour, yeast, seasonings and water to prepare a soybean curd bread dough, stirring and mixing the soybean curd bread to ferment the soybean curd bread dough, with fermentation being promoted by utilizing the property of magnesium chloride contained in the soybean curd bread dough to prepare a fermented soybean curd bread dough and baking the fermented soybean curd bread dough.

3 Claims, No Drawings

PROCESS FOR MAKING SOYBEAN CURD BREAD

BACKGROUND OF THE INVENTION

1. Field of the Invention

This invention concerns a process for making soybean curd bread.

2. Related Art Statement

Processes for making soybean curd bread have been disclosed in the following several literatures and the outline of inventions therein are explained.

(1) A process for making soybean curd bread in Japanese Patent Laid-Open No. 52234/1986 (hereinafter referred to as literature (1))

The invention disclosed in the literature (1) comprises a method of conditioning the solid content of soybean curd to 10%–30%, mixing the soybean curd with a soybean milk into a pasty state, adding a wheat flour to the pasty soybean curd mixture and then stirring and mixing them and applying a heat treatment. This process using the pasty soybean curd mixture has a feature in that the soybean curd bread can be made easily, and soybean curd bread of favorable feeling upon eating and with high nutritive values can be manufactured.

(2) A process for making a soybean curd bread in Japanese Patent Laid-Open No. 163954/1996 (hereinafter referred to as literature (2))

The invention comprises a method of mixing 10 parts by weight of powdery soybean curd refuse to 90 parts by weight of wheat flour to form a powdery soybean curd refuse mixture, adding additives such as yeast and oils and fats to the powdery mixture, adding water and then applying stirring and kneading at about 40° C. to promote fermentation and then baking them. This process has a feature in the effective utilization of soybean curd refuse and provision of soybean curd bread having bread-like feeling upon eating.

(3) A method of treating soybean curd refuse and bun incorporated with soybean curd refuse in Japanese Patent Laid-Open No. 316983/1993 (hereinafter referred to as literature (3))

The invention comprises adding and formulating wheat flour, seasonings and the like to 30% of soybean curd refuse or strained soybean curd refuse to form a formulated mixture, adding water to the formulated mixture, promoting fermentation by stirring and kneading and then baking the same. This process has substantially the same feature as that in the literature (1) described above.

The invention in the literature (1) utilizes soybean curd and/or soybean milk, which does not use existent soybean curd using calcium sulfate, that is, it does not use the soybean curd known as natural foods in its essential nature. Accordingly, it neither utilizes the natural soybean curd itself nor intends to enhance the intake of proteins efficiently, thus, leaves a problem.

The inventions in the literatures (2) and (3) effectively utilize soybean curd refuse as the residue of soybean curd but they neither intend to use the soybean curd in its nature nor intend to enhance the intake of proteins, thus, leave a problem.

As described above, while making of soybean curd bread is intended in the literatures (1)–(3), magnesium chloride is not used. Accordingly, homogeneous emulsification with magnesium chloride and promotion of fermentation cannot be expected.

SUMMARY OF THE INVENTION

The foregoing problems can be solved in accordance with this invention by a process for making soybean curd bread which comprises the steps of:

adding magnesium chloride to a soybean milk containing a predetermined solid content (about 13 wt %) and at a temperature of about 60° C. to 90° C. thereby homogeneously emulsifying the same (protein coagulation) to form soybean curd, adding a bread dough comprising wheat flour, yeast and seasonings and water to the thus formed soybean curd to prepare a soybean curd bread dough, stirring and mixing the soybean curd bread dough and fermenting the soybean curd bread dough by the stirring and mixing, the fermentation being promoted by utilizing the property of magnesium chloride contained in the soybean curd bread dough, preparing a fermented soybean curd bread dough by stirring and mixing and then baking the fermented soybean curd bread dough.

This method has an advantageous feature of homogeneous emulsification by magnesium chloride and promotion of fermentation, as well as thorough kneading between soybean curd and wheat flour thereby enabling to use the soybean curd in its nature or enhance the intake of proteins.

This invention also provides an improved process for making a soybean curd bread which comprises the steps of:

adding magnesium chloride to a soybean milk containing a predetermined solid content (about 13 wt %) and at a temperature of about 60° C. to 90° C. thereby homogeneously emulsifying the same (protein coagulation) to form soybean curd, adding a bread dough comprising wheat flour, yeast and seasonings, lecithin, water and magnesium chloride to the thus formed soybean curd to prepare a soybean curd bread dough, stirring and mixing the soybean curd bread dough and fermenting the soybean curd bread dough by the stirring and mixing, the fermentation being promoted by utilizing the property of magnesium chloride contained in the soybean curd bread dough, preparing a fermented soybean curd bread dough by stirring and mixing and then baking the fermented soybean curd bread dough.

This improved method has an advantageous feature also of homogeneous emulsification by magnesium chloride and promotion of fermentation, as well as thorough kneading between soybean curd and wheat flour thereby enabling to use the soybean curd in its nature or enhance the intake of proteins, and provision of moistened feeling upon eating of the soybean curd bread.

In a preferred embodiment, soybean curd is added by about 5% to 95% to the bread dough. This has an advantageous feature of optimizing the blending ratio of the soybean curd to the bread dough.

DESCRIPTION OF PREFERRED EMBODIMENTS

As described above, the soybean curd is prepared by adding magnesium chloride and/or lecithin to a soybean milk having about 13% by weight of solid content and at a temperature of about 60° C. to 90° C., and homogeneously emulsifying them by stirring in a mixer and standing still the mixture after stirring (protein coagulation over the entire soybean milk) and applying temperature control. The soybean curd dough was pulverized or processed into a pasty form. Magnesium chloride contained in the soybean milk improves the storability of the soybean curd bread. For example, molds do not grow even after storage at a normal temperature for about one week and the soybean curd bread gives no dried feeling and its taste is stable. Further, lecithin in the soybean milk is useful for homogeneous emulsification of the soybean milk (protein coagulation over the entire soybean milk) and can keep the softness of the soybean curd bread for a relatively long period of time.

A bread dough comprising such as wheat flour, yeast and seasonings, lecithin and/or magnesium chloride and water are added to the processed soybean curd containing magnesium chloride and/or lecithin to prepare a soybean curd bread dough. Then, the soybean bread dough is stirred and mixed for fermentation. During the fermentation process, magnesium chloride contained in the soybean milk serves advantageously for the promotion of fermentation, and lecithin contained in the soybean milk improves viscosity of the protein in the soybean milk and the protein in the wheat flour to ensure the kneaded state for both of them and combine them (in view of the properties of them) to create a new taste and enable uniform kneading of the soybean curd and the wheat flour. In other words, homogeneous emulsification and combination can promote the effect of the yeast to promote fermentation and advantageously serve to the creation of the new taste by uniform kneading of the soybean curd bread dough to form fermented soybean curd dough. The fermented soybean curd bread dough is baked to manufacture soybean curd bread.

In the process of adding lecithin and/or magnesium chloride, cooperative effect of lecithin in the soybean milk can enhance the viscosity of the protein in the soybean milk and the protein in the wheat flour to ensure the kneaded state between both of them and combine them (in view of the properties of them) to create a new taste and enable uniform kneading for the soybean curd and the wheat flour. In addition, magnesium chloride can promote the fermentation. Accordingly, the fermented soybean curd bread dough can be manufactured under further promotion of fermentation and creation of excellent taste compared with the case described above, to from a fermented soybean curd bread dough. The fermented soybean curd bread dough is baked to make a soybean curd bread. This process has a feature capable of manufacturing soybean curd bread in a reliable and easy way and ensuring moistened feeling upon eating.

EXAMPLE

Examples of this invention are to be explained below.

Example 1
(Blend ratio for two loafs of bread)

| Wheat flour | 660 g |
| Yeast | 20 g |
| Sugar | 66 g |
| Table salt | 10 g |
| Skim milk | 33 g |
| Butter | 66 g |
| Soybean curd | 340 g (306% water content) |
| Water | 123 g |
| Stirring and mixing time | about 42 min. |

The result of an analysis test is as shown below.

TABLE 1

Result for analysis test

| Item for analysis test | Result | Detectable limit | Note | Analysis method |
|---|---|---|---|---|
| Water content | 35.5 g/100 g | | | Heating at normal pressure |

TABLE 1-continued

Result for analysis test

| Item for analysis test | Result | Detectable limit | Note | Analysis method |
|---|---|---|---|---|
| Protein | 11.2 g/100 g | | 1 | Kjeldahl method |
| Fat | 4.8 g/100 g | | | Acid decomposition method |
| Ash | 1.7 g/100 g | | | Direct ashfying method |
| Carbohydrate | 46.7 g/100 g | | 2 | |
| Energy | 275 kcal/100 g | | 3 | |
| Sodium | 430 mg/100 g | | | Atomic absorption |
| Calcium | 56.1 mg/100 g | | | Permanganometry |
| Magnesium | 53.6 mg/100 g | | | Atomic absorption |

Note 1)
Nitrogen/protein conversion coefficient: 6.25
Note 2)
Calculation formula: 100 − (water content + protein + fat + ash)

Note 3) Energy/conversion coefficient: protein 4: fat 9: carbohydrate 4, according to the nutritive indication standard (Notification of the Ministry of Health and Welfare No. 146, 1996)

Example 2
(Blend ratio for two loafs of bread)

| Wheat flour | 660 g |
| Yeast | 20 g |
| Sugar | 66 g |
| Table salt | 10 g |
| Skim milk | 33 g |
| Lecithin | 10 g |
| Magnesium chloride | 33 g |
| Butter | 66 g |
| Soybean curd | 340 g (306% water content) |
| Water | 123 g |
| Stirring and mixing time | about 40 min. |

As described above, the soybean curd bread has a protein content of 11.2 g/100 g, which is increased by about 30% compared with ordinary bread. Accordingly, this invention can provide useful foods which are excellent in feeling upon eating and tastes, is highly nutritive and useful as healthy foods.

Example 3
(Blend ratio for two loafs of bread)

| Wheat flour | 660 g |
| Yeast | 20 g |
| Sugar | 66 g |
| Table salt | 10 g |
| Skim milk | 33 g |
| Butter | 66 g |
| Soybean curd | 300 g |
| Water | 160 g |
| Magnesium chloride | about 1 g |
| Linseeds | 20 g |

(1) Fermentation: Dough is fermented at a temperature of 27° C. for about 40 min.
(2) Temperature setting: An oven having upper and lower heaters is used.

Twin-hill hard toast or one roof type: at 0° C. for upper portion, at 230° C. for lower portion for 20 min.
Roll type: at 200° C. for both upper and lower portions for 40 min. Rotated by 180° C. after 20 min. such that upper and lower portions can be baked evenly.

As described above, linseeds containing a lot of aa-linolenic acid as ww-3 series aliphatic acid are also used and an effective ingredient of lignan enriched in food fibers are also contained.

What is claimed is:

1. A process for making soybean curd bread which comprises the steps of:

adding magnesium chloride to a soybean milk containing a predetermined solid content and at a temperature of about 60° C. to 90° C.

stirring, to homogeneously emulsify the soybean milk resulting in protein coagulation to form soybean curd, adding a bread dough comprising wheat flour, yeasts, seasonings and water to the thus formed soybean curd to prepare a soybean curd bread dough, stirring and mixing the soybean curd bread dough and fermenting the soybean curd bread dough while stirring and mixing, wherein fermentation is promoted by the magnesium chloride contained in the soybean curd bread dough, kneading the fermented soybean curd bread dough and then baking the fermented soybean curd bread dough.

2. A process for making soybean curd bread which comprises the steps of:

adding magnesium chloride to a soybean milk containing a predetermined solid content and at a temperature of about 60° C. to 90° C., stirring, to homogeneously emulsify the soybean milk resulting in protein coagulation to form soybean curd, adding a bread dough comprising wheat flour, yeasts seasonings, lecithin, water and magnesium chloride to the thus formed soybean curd to prepare a soybean curd bread dough, stirring and mixing the soybean curd bread dough and fermenting the soybean curd bread dough while stirring and mixing, wherein fermentation is promoted by the magnesium chloride contained in the soybean curd bread dough, kneading the fermented soybean curd bread dough and then baking the fermented soybean curd bread dough.

3. A process for making a soybean curd bread as defined in either claim 1 or 2, wherein the soybean curd is added in an amount ranging from about 5% to 95% of the bread dough.

* * * * *